United States Patent
Tsai et al.

(10) Patent No.: US 8,089,912 B2
(45) Date of Patent: Jan. 3, 2012

(54) MULTICAST COMMUNICATION METHOD, ACCOMPANIED WITH THE RELAY NODE AND WIRELESS NETWORK SYSTEM DESIGN

(75) Inventors: Chia-Hung Tsai, Changhua County (TW); Chao-Yu Chen, Kaohsiung (TW); Yi-Cheng Lu, Kaohsiung (TW); Yu-Chee Tseng, Hsinchu (TW); Lun-Chia Kuo, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 451 days.

(21) Appl. No.: 12/468,039

(22) Filed: May 18, 2009

(65) Prior Publication Data
US 2010/0150048 A1     Jun. 17, 2010

(30) Foreign Application Priority Data
Dec. 16, 2008   (TW) ............................... 97149073 A

(51) Int. Cl.
H04H 20/71 (2008.01)
H04B 7/185 (2006.01)
H04W 4/00 (2009.01)
H04L 12/28 (2006.01)
H04J 3/08 (2006.01)

(52) U.S. Cl. ........ 370/312; 370/316; 370/328; 370/390; 370/501

(58) Field of Classification Search ........................ None
See application file for complete search history.

(56) References Cited

U.S. PATENT DOCUMENTS

| 7,301,914 B2 | 11/2007 | Segal et al. |
| 7,330,699 B2 | 2/2008 | Chuah et al. |
| 2005/0169204 A1* | 8/2005 | Haumont et al. ............. 370/312 |

FOREIGN PATENT DOCUMENTS

| TW | 200509722 | 3/2005 |
| TW | 200541274 | 12/2005 |
| TW | 200733634 | 9/2007 |
| TW | 200737873 | 10/2007 |

* cited by examiner

Primary Examiner — Kwang B Yao
Assistant Examiner — Jutai Kao
(74) Attorney, Agent, or Firm — Jianq Chyun IP Office

(57) ABSTRACT

A multicast communication method for relaying a multicast packet from a first member node to a plurality of second member nodes in a wireless network is provided, wherein the first member node and the second member nodes belong to a same group and can communicate with each other via a plurality of non-member nodes. In the multicast communication method, a number and distances of the second member nodes are recorded. The multicast packet is received from the first member node, and a waiting time is determined according to the number and the distances of the second member nodes. Whether the multicast packet is broadcasted by any other relay node is monitored during the waiting time. If the multicast packet is already broadcasted to all the second member nodes by other relay node, the multicast packet is not broadcasted; otherwise, the multicast packet is broadcasted after the waiting time elapses.

25 Claims, 4 Drawing Sheets

| Index | Multicast member field | Distance field | Transmission state field |
|---|---|---|---|
| 1 | 114 | 2 | 0 |
| 2 | 116 | 2 | 0 |
| 3 | 118 | 2 | 0 |

US 8,089,912 B2

MULTICAST COMMUNICATION METHOD, ACCOMPANIED WITH THE RELAY NODE AND WIRELESS NETWORK SYSTEM DESIGN

CROSS-REFERENCE TO RELATED APPLICATION

This application claims the priority benefit of Taiwan application serial no. 97149073, filed on Dec. 16, 2008. The entirety of the above-mentioned patent application is hereby incorporated by reference herein and made a part of specification.

BACKGROUND

1. Technical Field

The disclosure relates to a multicast communication method, accompanied with the relay node and wireless network system design.

2. Background

Wireless sensor network will be broadly applied in our daily life along with the development of wireless sensor network technologies. Taking the ZigBee specification based on the IEEE 802.15.4 standard as an example, a multicast method is specified in the ZigBee specification document, wherein information is broadcasted to nodes belonging to a specific group. The multicast method specified in the ZigBee standard has a non-member mode and a member mode. In the non-member mode, packets are transmitted in a one-to-one (i.e., one node to one node) manner with a unicast, while in the member mode, packets are broadcasted. When a multicast communication starts, an initial node appoints a specific group as the target and issues a multicast packet to the specific group, wherein the initial node determines whether it belongs to the specific group before it issues the multicast packet. If the initial node does not belong to the specific group, it transmits the multicast packet to the next node in non-member mode. The multicast packet is transmitted in non-member mode until it reaches a member in the specific group, and then the multicast packet will be transmitted in member mode thereafter. To be specific, in the multicast method specified in the ZigBee specification document, a MaxNonMemberRadius field and a NonMemberRadius field are defined in each packet. The MaxNonMemberRadius field defines a radius (i.e., number of hops) which the minimum distance between a node in the specific group and any other node in the specific group should not exceed. For example, when the radius which should not be exceeded by the minimum distance is set to 2 hops, two nodes in the same group should be able to communicate within their communication ranges or via at most two nodes which do not belong to the group. The NonMemberRadius field records the number of nodes which do not belong to the specific group and are involved in the transmission of a multicast packet. Thus, when a node in the wireless sensor network receives the multicast packet, the node determines whether it has received the multicast packet before. The node discards the multicast packet if it has already received the multicast packet. If the node has not received the multicast packet before, the node checks whether it belongs to the specific group. If the node belongs to the specific group, it sets the value in the NonMemberRadius field to the value in the MaxNonMemberRadius field and broadcasts the received multicast packet. If the node does not belong to the specific group, it inspects the value in the NonMemberRadius field, wherein if the value in the NonMemberRadius field is 0, the relaying of the multicast packet is terminated; if the value in the NonMemberRadius field is 7, the relay number of the multicast packet is not limited and it is continued to relay the multicast packet; and if the value in the NonMemberRadius is between 1 and 6, the value in the NonMemberRadius field is decreased by 1 and the received multicast packet is relayed.

However, in the multicast method described above, even though a group is specified in the ZigBee standard to reduce the possibility of repeated packet and packet collision, in a network of higher node density, the power consumption will still be very high, and the power of those devices having lower power will be consumed quickly so that the operation time and lifespan of these devices will be shortened. Therefore, a multicast communication method which can reduce and balance the power consumption of all the nodes (for example, wireless sensors) and at the same time, can effectively broadcast information packets to member nodes in a specific group is desired.

SUMMARY

Consistent with the invention, there is provided a multicast communication method suitable for relaying a multicast packet from a first member node to a plurality of second member nodes in a wireless network, wherein the second member nodes and the first member node belong to a same group. The multicast communication method includes recording the number of and the distances to the second member nodes. The multicast communication method also includes receiving the multicast packet from the first member node, calculating a monitoring parameter according to the number of and distances to the second member nodes, and determining a waiting time according to the monitoring parameter. The multicast communication method further includes monitoring whether other node broadcasts the multicast packet during the waiting time, and when other node broadcasts the multicast packet, determining whether the multicast packet is transmitted to all the second member nodes, wherein the multicast packet is not broadcasted if the multicast packet is already transmitted to all the second member nodes, or the multicast packet is broadcasted after the waiting time elapses if the multicast packet is not transmitted to all the second member nodes.

Also consistent with the invention, there is provided a relay node for relaying a multicast packet from a first member node to a plurality of second member nodes in a wireless network, wherein the second member nodes and the first member node belong to a same group. The relay node includes a radio frequency (RF) antenna for receiving and transmitting the multicast packet, a memory, and a multicast unit electrically connected to the RF antenna and the memory. The memory stores the number of and the distances to the second member nodes. The multicast unit calculates a monitoring parameter according to the number of and the distances to the second member nodes and determines a waiting time according to the monitoring parameter. The multicast unit monitors whether other node broadcasts the multicast packet during the waiting time, and when other node broadcasts the multicast packet, the multicast unit determines whether the multicast packet broadcasted by the other node is already transmitted to all the second member nodes which exist in the memory, wherein the multicast unit does not broadcast the received multicast packet if the multicast packet broadcasted by the other node is already transmitted to all the second member nodes which exist in the memory; otherwise the multicast unit broadcasts the received multicast packet after the waiting time elapses if the multicast packet broadcasted by the other node is not transmitted to all the second member nodes which exist in the memory.

Further, consistent with the invention, there is provided a wireless network system including a plurality of member nodes and a plurality of non-member nodes. The member nodes include a plurality of member relay nodes, and the non-member nodes include a plurality of non-member relay nodes, wherein a wireless network is formed within a communication range between the member nodes and the non-member nodes. In the wireless network system, each of the non-member nodes and member nodes records the number of and the distances to the communicable member nodes, calculates a corresponding monitoring parameter according to the number of and distances to the communicable member nodes, and determines a corresponding waiting time according to the corresponding monitoring parameter. When one of the member nodes transmits a multicast packet to the other member nodes, each of the member relay nodes or non-member relay nodes which receives the multicast packet monitors whether other member relay node or non-member relay node broadcasts the multicast packet during the corresponding waiting time. In addition, each of the member relay nodes or non-member relay nodes which receives the multicast packet determines whether the other member relay node or non-member relay node already transmits the multicast packet to all the communicable member nodes thereof when the other member relay node or non-member relay node broadcasts the multicast packet. The broadcast of the received multicast packet is stopped if the multicast packet is already transmitted to all the communicable member nodes; otherwise the received multicast packet is broadcasted.

As described above, in the multicast communication method provided consistent with the invention, when a multicast packet to be relayed is received, a waiting time is calculated according to a monitoring parameter, and whether the multicast packet is transmitted to the target nodes is monitored during the waiting time. If the multicast packet is already transmitted to the target nodes, the multicast packet is not broadcasted after the waiting time elapses. Therefore, repeated packet broadcasting is avoided and the power consumption of the wireless network system is reduced.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
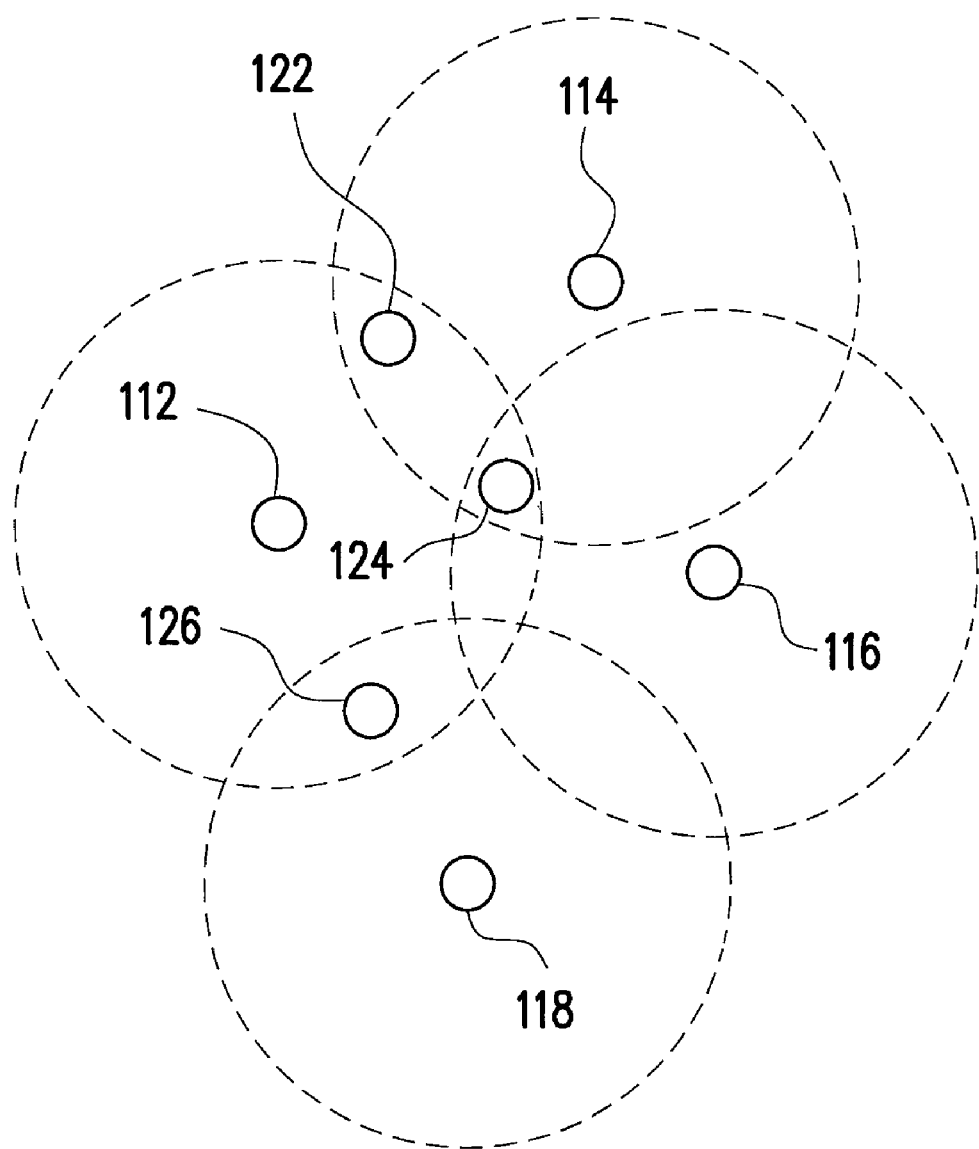
FIG. 1 is a diagram of a wireless network system according to an exemplary embodiment consistent with the invention.

Reference will now be made in detail to the present preferred exemplary embodiments of the invention, examples of which are illustrated in the accompanying drawings. Wherever possible, the same reference numbers are used in the drawings and the description to refer to the same or like parts.

In the exemplary embodiment consistent with the invention is directed to a multicast communication method which can efficiently broadcast a multicast packet and at the same, reduce and balance the power consumption of nodes.

In the exemplary embodiment consistent with the invention is also directed to a relay node which can efficiently broadcast a multicast packet and at the same, reduce and balance the power consumption of nodes.

In the exemplary embodiment consistent with the invention is further directed to a wireless network system which can efficiently broadcast a multicast packet and at the same time, reduce and balance the power consumption of nodes.

In the multicast communication method provided by the invention, the communicable member nodes of each relay node in a wireless network are recorded in the relay node, and when the relay node relays a multicast packet, whether any other relay node has already broadcasted the multicast packet to the other communicable member nodes is first determined. If the multicast packet has been broadcasted to the communicable member nodes by other relay node, the relay node does not broadcast the multicast packet. As a result, the power consumption is reduced. Exemplary embodiments of the invention will be described below with reference to accompanying drawing.

FIG. 1 is a diagram of a wireless network system according to an exemplary embodiment of the invention.

Referring to FIG. 1, the wireless network system 100 includes a plurality of member relay nodes 112, 114, 116, and 118 and a plurality of non-member relay nodes 122, 124, and 126, wherein a wireless network is formed within the communication range between the member relay nodes 112, 114, 116, and 118 and the non-member relay nodes 122, 124, and 126.

In the present exemplary embodiment, the wireless network system 100 is a ZigBee wireless sensor network system conforming to the ZigBee communication protocol. However, the invention is not limited to being applied to the ZigBee wireless sensor network. In other words, the multicast communication method in the present exemplary embodiment may also be applied to other suitable wireless ad-hoc networks conforming to other communication protocols.

It should be mentioned that since the wireless network system 100 in the present exemplary embodiment is a ZigBee wireless sensor network system conforming to the ZigBee communication protocol, the wireless network system 100 further includes a ZigBee coordinator (not shown) for establishing a wireless sensor network environment. In other words, the wireless network composed of the member relay nodes 112, 114, 116, and 118 and the non-member relay nodes 122, 124, and 126 is a wireless sensor network constructed on the wireless sensor network environment established by the ZigBee coordinator, wherein the ZigBee coordinator or router controls nodes joining the wireless sensor network, assigns network addresses, and collects data, etc. Thus, the wireless sensor network constructed on the wireless sensor network environment established by the ZigBee coordinator allows a node to dynamically join or leave the network.

Generally speaking, a plurality of wireless sensor nodes in a ZigBee wireless sensor network can be grouped into a plurality of groups, wherein each wireless sensor node may be grouped into multiple groups. After that, a management system (not shown) may issue a message or instruction to a specific group according to the requirement. For example, the management system may request a wireless sensor node for detecting temperature to report the temperature it detects. In the present exemplary embodiment, the member relay nodes 112, 114, and 116 are grouped into a group A, and the non-member relay nodes 122, 124, and 126 do not belong to this group A. It should be mentioned that in the present exemplary embodiment, a node not belonging to the group A (for example, the non-member relay node 122, 124, or 126) may inquire whether there is any node belonging to the group A within its communication range to join the group A by broadcasting a member information request (MIR). The node not belonging to the group A may joins the group A when it receives a response from one of the member relay nodes 112, 114, and 116. Namely, the member nodes in the group A may change dynamically.

In addition, the node joins a wireless sensor network controlled by the same ZigBee coordinator in the ZigBee wireless sensor network can exchange data and communicate with other nodes within the communication range of this node. However, this node has to exchange data or communicate with those nodes not belonging to the communication range thereof via relay nodes (i.e., ZigBee routers). Besides, as described above, the distance between the nodes belonging to the same group should not exceed a MaxNonMemberRadius. In the present exemplary embodiment, the member relay nodes 112, 114, 116, and 118, and the non-member relay node 122, 124, and 126 are respectively a ZigBee router which can relay data.

The member relay nodes 112, 114, 116, and 118 and the non-member relay nodes 122, 124, and 126 have the same structure. Below, the member relay node 112 will be described as an example.

Figures 2, 3:
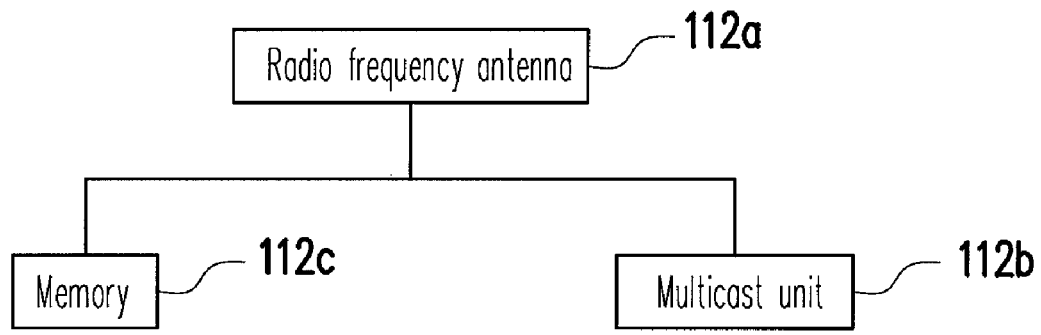
FIG. 2 is a schematic block diagram of a relay node according to an exemplary embodiment consistent with the invention.
FIG. 3 illustrates an example of a multicast information table according to an exemplary embodiment consistent with the invention.

FIG. 2 is a schematic block diagram of the relay node 112 according to an exemplary embodiment of the invention.

Figure 4:
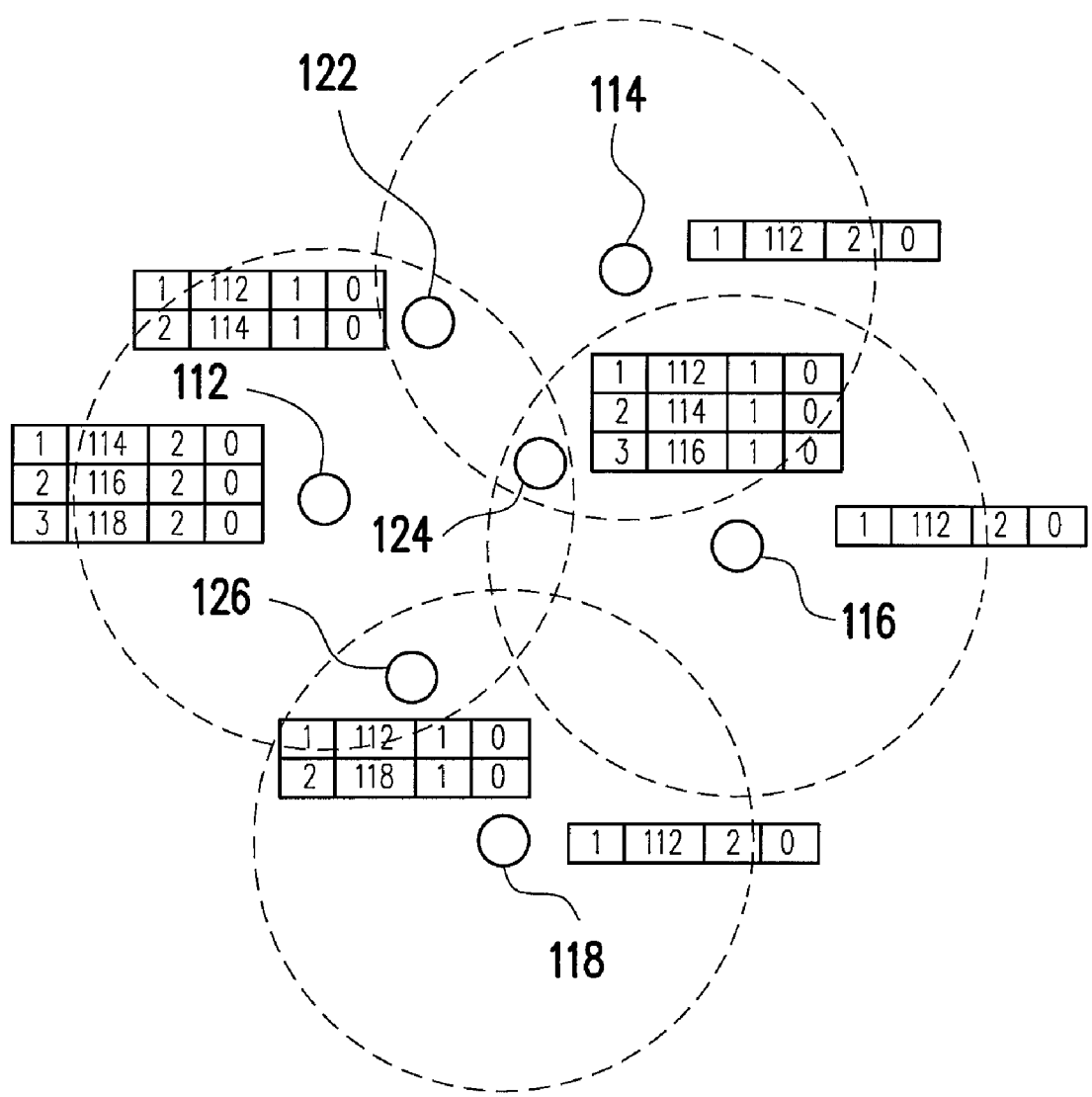
FIG. 4 illustrates an example of a multicast information of each node in a wireless network system according to an exemplary embodiment consistent with the invention.

Referring to FIG. 2, the member relay node 112 includes a radio frequency (RF) antenna 112*a*, a multicast unit 112*b*, and a memory 112*c*. The RF antenna 112*a* receives and transmits data or instruction packets. The multicast unit 112*b* is electrically connected to the RF antenna 112*a* for executing a multicast communication function in the present exemplary embodiment. The memory 112*c* is electrically connected to the multicast unit 112*b* for storing the following multicast information table and related data. In the present exemplary embodiment, the memory 112*c* is a non-volatile memory. It should be mentioned that the multicast function (as shown in FIG. 4) provided by the present exemplary embodiment is implemented with a hardware structure (i.e., the multicast unit 112*b*). However, the multicast function in the present exemplary embodiment may also be implemented as a software and stored in the memory 112*c*, wherein when the member relay node 112 is started, the software is executed by a microprocessor unit (not shown) of the member relay node 112. In addition, the member relay node 112 may further include a sensor device (not shown) for detecting a specific environmental parameter according to the actual application.

It should be mentioned that the wireless network system 100 may further include a plurality of ZigBee end devices (not shown), and these ZigBee end devices may be member nodes belonging to the same group as the member relay nodes 112, 114, and 116 or non-member nodes not belonging to this group. However, since the invention is focused on the relaying of the multicast packet, the ZigBee end devices which can only transmit or receive packets will not be described herein.

In the present exemplary embodiment, the MaxNonMemberRadius is set to 2. Accordingly, the non-member relay nodes 122, 124, and 126 are within the communication range of the member relay node 112, the member relay node 114 is within the communication ranges of both the non-member node 122 and the non-member relay node 124, the member relay node 116 is within the communication range of the non-member relay node 124, and the member relay node 118 is within the communication range of the non-member relay node 126. It should be understood that the network topology illustrated in FIG. 1 is only an example but not for limiting the invention.

In the present exemplary embodiment, the member relay nodes 112, 114, 116, and 118 and the non-member relay nodes 122, 124, and 126 respectively record a multicast information table in the memory thereof, wherein the multicast information table is used for recording the communicable member nodes and the distances thereof.

FIG. 3 illustrates an example of a multicast information table according to an exemplary embodiment of the invention, and FIG. 4 illustrates an example of a multicast information of each node in a wireless network system according to an exemplary embodiment of the invention.

Referring to FIG. 3, the multicast information table includes an index field 302, a multicast member field 304, a distance field 306, and a transmission state field 308. The index field 302 records the data numbers in the multicast information table, the multicast member field 304 records the communicable member nodes belonging to a specific group, the distance field 306 records the distances of the communicable member nodes, and the transmission state field 308 records whether a multicast packet is transmitted to the communicable member nodes each time when a multicast packet is relayed. In the present exemplary embodiment, the multicast packet is not transmitted to the communicable member nodes when "0" is recorded in the transmission state field 308, and the multicast packet is already transmitted to the communicable member nodes when "1" is recorded in the transmission state field 308. However, the invention is not limited thereto, and other symbols may also be used for indicating foregoing two different situations in another exemplary embodiment of the invention.

For example, the multicast information table (as shown in FIG. 3 and FIG. 4) of the member relay node 112 records that the member relay node 112 can communicate with the member relay nodes 114, 116, and 118 in the group A and the distances between the member relay node 112 and the member relay nodes 114, 116, and 118 are respectively 2 hops, 2 hops, and 2 hops. The multicast information table (as shown in FIG. 4) of the member relay node 114 records that the member relay node 114 can communicate with the member relay node 112 in the group A and the distance between the member relay node 114 and the member relay node 112 is 2 hops. The multicast information table (as shown in FIG. 4) of the member relay node 116 records that the member relay node 116 can communicate with the member relay node 112 in the group A and the distance between the member relay node 116 and the member relay node 112 is 2 hops. The multicast information table (as shown in FIG. 4) of the member relay node 118 records that the member relay node 118 can communicate with the member relay node 112 in the group A and the distance between the member relay node 118 and the member relay node 112 is 2 hops.

Additionally, the multicast information table (as shown in FIG. 4) of the non-member relay node 122 records that the non-member relay node 122 can communicate with the member relay nodes 112 and 114 in the group A and the distances between the non-member relay node 122 and the member relay nodes 112 and 114 are respectively 1 hop and 1 hop. The multicast information table (as shown in FIG. 4) of the non-member relay node 124 records that the non-member relay node 124 can communicate with the member relay nodes 112, 114, and 116 in the group A and the distances between the non-member relay node 124 and the member relay nodes 112, 114, and 116 are respectively 1 hop, 1 hop, and 1 hop. The multicast information table (as shown in FIG. 4) of the non-member relay node 126 records that the non-member relay node 126 can communicate with the member relay nodes 112 and 118 in the group A and the distances between the non-member relay node 126 and the member relay nodes 112 and 118 are respectively 1 hop and 1 hop.

It should be mentioned that in the present exemplary embodiment, only the multicast information table related to the group A is respectively maintained and updated in the member relay nodes 112, 114, 116, and 118 and the non-member relay nodes 122, 124, and 126. However, in another exemplary embodiment of the invention wherein the wireless network system 100 includes multiple groups, a plurality of multicast information tables belonging to different groups are maintained and updated in the member relay nodes 112, 114, 116, and 118 and the non-member relay nodes 122, 124, and 126.

In the present exemplary embodiment, the nodes (i.e., the member relay nodes 112, 114, 116, and 118 and the non-member relay nodes 122, 124, and 126) in the wireless network system 100 periodically broadcast a member information packet broadcast (MIPB), and the node which receives the MIPB updates the corresponding multicast information table according to the MIPB. In other words, the member relay nodes 112, 114, 116, and 118 and the non-member relay nodes 122, 124, and 126 in the wireless network system 100 obtain the communicable nodes by broadcasting and receiving the MIPB and record the member nodes belonging to the group A and the distances thereof into the corresponding multicast information table. Besides, the nodes in the wireless network system 100 can dynamically update the information of the member nodes belonging to a specific group according to the MIPB. For example, it is determined that the member relay node 112 has left the group A if the member relay nodes 114, 116, and 118 and the non-member relay nodes 122, 124, and 126 do not receive the MIPB of the member relay node 112 within a predetermined period.

In the present exemplary embodiment, when the member relay nodes 112, 114, 116, and 118 and the non-member relay nodes 122, 124, and 126 receive a multicast packet to be relayed to the group A, the member relay nodes 112, 114, 116, and 118 and the non-member relay nodes 122, 124, and 126 respectively relay the received multicast packet according to the corresponding multicast information table thereof. In particular, in the present exemplary embodiment, when a relay node receives the multicast packet to be relayed to the specific group, the relay node calculates a corresponding monitoring parameter according to the corresponding multicast information table and determines a corresponding waiting time according to the monitoring parameter. After that, the relay node monitors the multicast packets broadcasted by other relay nodes in the wireless sensor network during the waiting time. If those member nodes which can communicate with the relay node and belong to the specific group have received the multicast packet from other relay node, the relay node does not broadcast the multicast packet; otherwise, the relay node broadcasts the multicast packet after the waiting time elapses.

In the present exemplary embodiment, the monitoring parameter is calculated according to the number of member nodes in the specific group which can communicate with the relay node for relaying the multicast packet and the total distance to these communicable member nodes, and the monitoring parameter T can be expressed with following expression (1):

$$f_{max} = G$$

$$f_{min} = 1/\text{MaxNonmemberRadius}$$

$$T = (1 - (((M/(H-M+1) - f_{min}))/(f_{max} - f_{min}))) \times T_{max} \qquad (1)$$

Herein M represents the number of member nodes in the specific group which can communicate with the relay node for relaying the multicast packet, H represents the total distance between all the communicable member nodes and the relay node, G represents the total number of member nodes belonging to the group A in the wireless sensor network, MaxNonmemberRadius represent the maximum non-member radius, and $T_{max}$ represents a longest waiting time predetermined in the wireless sensor network. It should be mentioned that in the present exemplary embodiment, for the convenience of calculation, the monitoring parameter T is directly served as the waiting time. However, in another exemplary embodiment of the invention, the waiting time may also be a random number between 0 and the monitoring parameter T. Namely, local optimization can be avoided by randomly selecting a number as the waiting time of the relay node according to the monitoring parameter T.

Below, the present exemplary embodiment will be described in detail with reference to FIG. 4, wherein the non-member relay nodes 122, 124, and 126 relay a multicast packet broadcasted by the member relay node 112 to the member relay nodes 114, 116, and 118. In the present exemplary embodiment, there are totally four member nodes belonging to the group A in the wireless sensor network, the MaxNonMemberRadius is 1 hop, and the longest waiting time is 3 unit time.

As shown in FIG. 4, the non-member relay nodes 122, 124, and 126 are within the communication range of the member relay node 112. Thus, when the member relay node 112 broadcasts a multicast packet P to the member nodes (i.e., the member relay node 114, 116, and 118) in the group A, the non-member relay nodes 122, 124, and 126 receive the multicast packet. It should be mentioned that in the present exemplary embodiment, the member relay node 112 is the first node for transmitting the multicast packet P and it belongs to the group A. Thus, the member relay node 112 broadcasts the multicast packet P directly in the member mode. However, in another exemplary embodiment of the invention, the member relay node 112 may also receive the multicast packet P from a non-member node not belonging to the group A. In this case, the member relay node 112 receives the multicast packet P from the non-member node not belonging to the group A in the non-member mode.

Referring to FIG. 4 again, when the non-member relay nodes 122, 124, and 126 receive the multicast packet P, the non-member relay nodes 122, 124, and 126 respectively calculate the monitoring parameter and the waiting time thereof.

To be specific, when the non-member relay node 122 receives the multicast packet P, it gets to know that the multicast packet P is to be transmitted to the group A. Thus, the non-member relay node 122 calculates the monitoring parameter according to the information (i.e., the number and distances of the member nodes in the group A which can communicate with the non-member relay node 122) in the multicast information table thereof. For example, there are two member nodes (i.e., the member nodes 112 and 114) which belong to the group A and are within the communication range of the non-member relay node 122, and the distances of these two member nodes are respectively 1 hop. Thus, the waiting time of the non-member relay node 122 can be calculated through the expression (1) as 2 unit time (i.e., $(1-(2/(2-2+1)-(1/1))/(4-(1/1)))\times 3)$. Similarly, the waiting time of the non-member relay node 124 is 1 unit time (i.e., $(1-(3/(3-3+1)-(1/1))/(4-(1/1)))\times 3)$, and the waiting time of the non-member relay node 126 is 2 unit time (i.e., $(1-(2/(2-2+1)-(1/1))/(4-(1/1)))\times 3)$. In addition, because the multicast packet P comes from the member node 112 which belongs to the group A, the non-member relay nodes 122, 124, and 126 respectively record that the member node 112 already has the multicast packet P in the transmission state field of the corresponding multicast information table.

The non-member relay nodes 122, 124, and 126 monitor other broadcast during the corresponding waiting time thereof. When it reaches 1 unit time, the non-member relay node 124 determines that there are still member nodes (i.e., the member nodes 114 and 116) belonging to the group A in the multicast information table which have not received the multicast packet P. Thus, the non-member relay node 124 broadcasts the multicast packet P to relay the same. When the non-member relay nodes 122 and 126 detect the multicast packet P broadcasted by the non-member relay node 124, the non-member relay nodes 122 and 126 determine that the multicast packet P has been received from the member node 112. In addition, the non-member relay nodes 122 and 126 get to know from the relayed multicast packet P that the non-member relay node 124 has broadcasted the multicast packet P to the member nodes 114 and 116. In particular, the multicast information table of the non-member relay node 122 contains the information of the member node 114. Thus, the non-member relay node 122 records that the member node 114 has received the multicast packet P.

When it reaches 2 unit time, the non-member relay node 122 determines that all the member nodes belonging to the group A in the multicast information table have received the multicast packet P. Thus, the non-member relay node 122 does not broadcast the multicast packet P. In addition, the non-member relay node 126 determines that there is still member node (i.e., the member node 118) belonging to the group A in the multicast information table which does not receive the multicast packet P yet. Accordingly, the non-member relay node 126 broadcasts the multicast packet P.

In the exemplary embodiment described above, the multicast packet P is relayed to the member nodes in the group A without going through the non-member relay node 122. Thus, the power consumption of the wireless network system 100 is reduced.

It should be mentioned that since power is consumed whenever a packet is received or transmitted in a wireless sensor network, in another exemplary embodiment of the invention, the monitoring parameter may be calculated according to the power of nodes adjacent to the relay node for relaying the multicast packet, so as to balance the power consumption of all the nodes in the wireless network system 100. For example, the monitoring parameter T' may be calculated by taking the power of adjacent nodes into consideration through the following expression (2):

$f_{max} = G/E_t$ $f_{min} = 1/(E_t \times \text{MaxNonmemberRadius})$ $T' = (1-(((M/(H-M+1)-f_{min}))/(f_{max}-f_{min})))\times$ $T_{max} \times (E_n/E_r)$ (2)

Herein $E_t$ represents the power consumed for relaying the multicast packet, $E_n$ represents the average value of remaining power of those nodes which are 1 hop away from the relay node, and $E_r$ represents the remaining power of the relay node. Accordingly, the remaining power of the relay node and the power of the adjacent nodes may be further considered while calculating the waiting time so that the power consumption of the wireless network system 100 can be balanced and the lifespan thereof can be prolonged. It should be mentioned that each node may inform adjacent nodes in the wireless network system 100 about its remaining power through foregoing member information packet.

Figure 5:
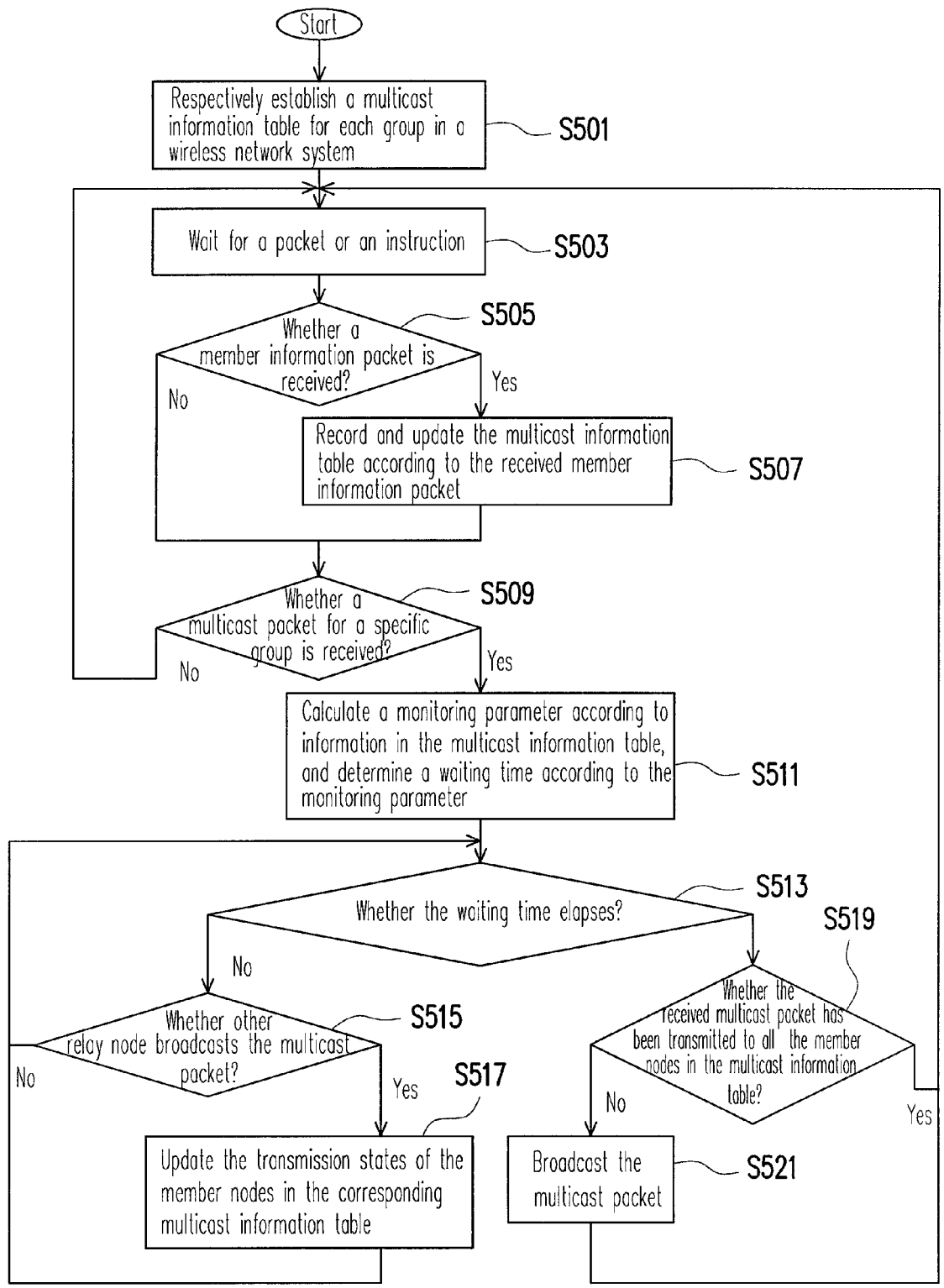
FIG. 5 is a flowchart of a multicast communication method executed by each relay node according to an exemplary embodiment consistent with the invention.

FIG. 5 is a flowchart of a multicast communication method executed by each relay node according to an exemplary embodiment of the invention. It should be understood that the sequence of steps illustrated in FIG. 5 is not intended for limiting the invention, and those skilled in the art should be able to execute the steps in another sequence without departing the scope and spirit of the invention.

Referring to FIG. 5, the procedure 500 is constantly executed by the relay nodes (for example, all the relay nodes in FIG. 1) after they are deployed into an application environment. The application environment includes temperature or humidity detection in a forest monitoring application, the temperature detection in an air conditioning application, or information provision to consumers of a specific group in a shopping application.

In step S501, the relay node establishes a multicast information table for each group (for example, a group A) in the wireless network system 100. Then, in step S503, the relay node waits for receiving a packet or an instruction. To be specific, because the wireless network system 100 is a wireless sensor network, the relay node (i.e., a ZigBee router) constantly detects the related value and waits for the system instruction in step S503.

Next, in step S505, the relay node determines whether a member information packet is received. As described above, in the wireless network system 100, the current state of each group may be determined by periodically broadcasting a member information packet.

If the member information packet is received in step S505, in step S507, the relay node records and updates the multicast information table (for example, information about communicable member nodes and the distances thereof) according to the received member information packet.

Thereafter, in step S509, the relay node determines whether a multicast packet belonging to the specific group (for example, the group A) is received.

If it is determined in step S509 that no multicast packet is received, the procedure 500 returns to step S503. If it is determined in step S509 that no multicast packet belonging to the specific group (for example, the group A) is received, in step S511, the relay node calculates a monitoring parameter according to information (i.e., the number and distances of member nodes in the specific group) in the multicast information table and determines a waiting time according to the monitoring parameter. Next, in step S513, whether the waiting time elapses is determined.

If it is determined in step S513 that the waiting time does not elapse yet, in step S515, the relay node monitors whether other relay node broadcasts the multicast packet during the waiting time. If the relay node monitors that other relay node broadcasts the multicast packet, in step S517, the relay node updates the transmission states of the member nodes in the corresponding multicast information table, and the procedure 500 returns to step S513. If in step S513 it is determined that the waiting time elapses, in step S519, whether all the member nodes in the multicast information table have received the multicast packet is determined.

If it is determined in step S519 that there is still member node in the multicast information table that does not receive the multicast packet, in step S521, the relay node broadcasts the multicast packet. If it is determined in step S519 that all the member nodes in the multicast information table have received the multicast packet, the procedure 500 returns to step S503. In addition, once the relay node in the wireless network system 100 starts to execute the procedure 500, it will continue executing the procedure 500 until the power of the relay node is used up or an operator terminates the operation of the relay node.

As described above, in the multicast communication method provided by the invention, before a relay node relays a multicast packet, the relay node first detects whether there is other relay node broadcasting the multicast packet, and when it detects that there is already other relay node broadcasting the multicast packet to the adjacent member nodes, the relay node does not broadcast the multicast packet. As a result, the power consumption of the wireless network system is reduced and the operation time of the wireless network system is prolonged. In addition, when the invention is applied to a ZigBee wireless sensor network, the maximum non-member radius specified in the ZigBee standard regarding multicast can be satisfied so that a controllable range of each group can be achieved. Moreover, in the multicast communication method provided by the invention, each relay node only records information of adjacent nodes instead of information of all the member nodes or routers. Thus, less memory space is taken. Furthermore, the invention supports mobile network, and nodes can dynamically join or leave a network within a group range, and no positioning information is required for transmitting packets. Thus, the invention is suitable for information communication between many groups.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A multicast communication method, for relaying a multicast packet from a first member node to a plurality of second member nodes in a wireless network, wherein the second member nodes and the first member node belong to a same group, the multicast communication method comprising:
   recording a number and distances of the second member nodes;
   receiving the multicast packet from the first member node;
   calculating a monitoring parameter according to the number and the distances of the second member nodes;
   determining a waiting time according to the monitoring parameter;
   monitoring whether at least one other node broadcasts the multicast packet during the waiting time; and
   when the at least one other node broadcasts the multicast packet, determining whether the multicast packet broadcasted by the at least one other node is transmitted to all the second member nodes,
   wherein if the multicast packet broadcasted by the at least one other node is already transmitted to all the second member nodes, the received multicast packet is not broadcasted; otherwise, the received multicast packet is broadcasted after the waiting time elapses.

2. The multicast communication method according to claim 1, wherein the step of determining the waiting time according to the monitoring parameter comprises generating a random number as the waiting time according to the monitoring parameter.

3. The multicast communication method according to claim 1, wherein the step of recording the number and the distances of the second member nodes comprises:
   establishing a multicast information table, wherein the multicast information table comprises a multicast member field and a distance field;
   receiving a member information packet; and
   recording and updating the number and the distances of the second member nodes according to the member information packet.

4. The multicast communication method according to claim 3, wherein the step of receiving the member information packet comprises periodically or a periodically receiving the member information packet through a beacon message.

5. The multicast communication method according to claim 3, wherein the step of determining whether the multicast packet broadcasted by the at least one other node is transmitted to all the second member nodes comprises recording whether each of the second member nodes has received the multicast packet in the multicast information table.

6. The multicast communication method according to claim 1, further comprising recording a power of at least one adjacent node, wherein the step of calculating the monitoring parameter according to the number and the distances of the second member nodes comprises calculating the monitoring parameter according to the number and the distances of the second member nodes and the power of the at least one adjacent node.

7. The multicast communication method according to claim 1, wherein the second member nodes communicate with the first member node via at least one non-member node.

8. A relay node, for relaying a multicast packet from a first member node to a plurality of second member nodes in a wireless network, wherein the second member nodes and the first member node belong to a same group, the relay node comprising:
   a radio frequency (RF) antenna, for receiving and transmitting the multicast packet;
   a memory, for storing a number and distances of the second member nodes; and
   a multicast unit, electrically connected to the memory and the RF antenna, for calculating a monitoring parameter according to the number and the distances of the second member nodes and determining a waiting time according to the monitoring parameter,
   wherein the multicast unit monitors whether at least one other node broadcasts the multicast packet during the waiting time, and when the at least one other node broadcasts the multicast packet, the multicast unit determines whether the multicast packet broadcasted by the at least one other node is transmitted to all the second member nodes,
   wherein if the multicast packet broadcasted by the at least one other node is already transmitted to all the second member nodes, the multicast unit does not broadcast the received multicast packet; otherwise, the multicast unit broadcasts the received multicast packet after the waiting time elapses.

9. The relay node according to claim 8, wherein the multicast unit generates a random number as the waiting time according to the monitoring parameter.

10. The relay node according to claim 8, wherein the memory comprises a multicast information table, and the multicast information table comprises a multicast member field and a distance field.

11. The relay node according to claim 10, wherein the RF antenna receives a member information packet from the second member nodes, and the multicast unit records and updates the multicast member field and the distance field according to the member information packet.

12. The relay node according to claim 11, wherein the RF antenna periodically or a periodically receives the member information packet through a beacon message.

13. The relay node according to claim 10, wherein the multicast information table further comprises a transmission state field for recording whether each of the second member nodes receives the multicast packet.

14. The relay node according to claim 8, wherein the memory further stores a power of at least one adjacent node, wherein the multicast unit further calculates the monitoring parameter according to the power of the at least one adjacent node.

15. The relay node according to claim 8, wherein the second member nodes communicate with the first member node via at least one non-member node.

16. A wireless network system, comprising:
a plurality of member nodes, comprising a plurality of member relay nodes; and
a plurality of non-member nodes, comprising a plurality of non-member relay nodes, wherein a wireless network is formed within a communication range between the member nodes and the non-member nodes,
wherein each of the non-member nodes and member nodes records a number and distances of the communicable member nodes, calculates a corresponding monitoring parameter according to the number and distances of the communicable member nodes, and determines a corresponding waiting time according to the corresponding monitoring parameter,
wherein when one of the member nodes transmits a multicast packet to the other member nodes, each of the member relay nodes or non-member relay nodes which receives the multicast packet monitors whether other member relay node or non-member relay node broadcasts the multicast packet during the corresponding waiting time, determines whether the other member relay node or non-member relay node which broadcasts the multicast packet already transmits the multicast packet to all the communicable member nodes when the other member relay node or non-member relay node broadcasts the multicast packet, and stops to broadcast the received multicast packet if the multicast packet is already transmitted to all the communicable member nodes and otherwise, broadcasts the received multicast packet after the waiting time elapses.

17. The wireless network system according to claim 16, wherein each of the member relay nodes and non-member relay nodes generates a random number as the waiting time according to the monitoring parameter.

18. The wireless network system according to claim 16, wherein the step of recording the number and the distances of the communicable member nodes by each of the member relay nodes and non-member relay nodes comprises:
establishing a multicast information table, wherein the multicast information table comprises a multicast member field and a distance field;
receiving a member information packet; and
recording and updating the number and the distances of the communicable member nodes according to the member information packet.

19. The wireless network system according to claim 18, wherein the step of receiving the member information packet comprises periodically or a periodically receiving the member information packet through a beacon message.

20. The wireless network system according to claim 18, wherein the step of determining whether the other member relay node or non-member relay node broadcasting the multicast packet already transmits the multicast packet to all the communicable member nodes comprises recording whether each of the communicable member nodes already receives the multicast packet in the multicast information table.

21. The wireless network system according to claim 16, wherein each of the member relay nodes or non-member relay nodes which receives the multicast packet further records a power of at least one adjacent node, wherein each of the member relay nodes and non-member relay nodes further calculates the monitoring parameter according to the power of the at least one adjacent node.

22. The wireless network system according to claim 16, wherein the wireless network is a ZigBee wireless sensor network, the wireless network further comprises a ZigBee coordinator, and the member relay nodes and the non-member relay nodes are respectively a ZigBee router.

23. The wireless network system according to claim 22, wherein each of the member relay nodes or non-member relay nodes which receives the multicast packet broadcasts the received multicast packet in a member mode.

24. The wireless network system according to claim 23, wherein the one of the member nodes which transmits the multicast packet receives the multicast packet in a non-member mode.

25. The wireless network system according to claim 16, wherein the member nodes communicate with each other via at least one of the non-member nodes.

* * * * *